United States Patent
Reno et al.

(10) Patent No.: US 11,340,933 B2
(45) Date of Patent: *May 24, 2022

(54) METHOD AND APPARATUS FOR SECRETS INJECTION INTO CONTAINERS FOR 5G NETWORK ELEMENTS

(71) Applicant: Telefonaktiebolaget LM Ericsson (publ), Stockholm (SE)

(72) Inventors: James Donald Reno, Scotts Valley, CA (US); Michael Brown, Fremont, CA (US); Akshay Rajesh Baheti, Redwood City, CA (US); Michael Cameron, McKinney, TX (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/940,851

(22) Filed: Jul. 28, 2020

(65) Prior Publication Data

US 2020/0359451 A1 Nov. 12, 2020

Related U.S. Application Data

(63) Continuation-in-part of application No. 15/813,016, filed on Nov. 14, 2017, now Pat. No. 10,761,871.

(51) Int. Cl.
*G06F 9/455* (2018.01)
*G06F 21/00* (2013.01)
(Continued)

(52) U.S. Cl.
CPC .......... *G06F 9/45558* (2013.01); *G06F 9/455* (2013.01); *G06F 9/45504* (2013.01);
(Continued)

(58) Field of Classification Search
CPC .. G06F 9/455; G06F 9/45504; G06F 9/45533; G06F 9/45558; G06F 9/45587;
(Continued)

(56) References Cited

U.S. PATENT DOCUMENTS 10,027,658 B1 * 7/2018 Schwarz ................. H04L 63/10
2015/0379287 A1 12/2015 Mathur et al.
(Continued)

FOREIGN PATENT DOCUMENTS

WO 2020/084335 A1 4/2020

*Primary Examiner* — Charles M Swift
(74) *Attorney, Agent, or Firm* — NDWE LLP

(57) ABSTRACT

A method and system for managing dynamic runtime information provision for a container implementing a Session Management Function (SMF) executed by an electronic device in a $3^{rd}$ generation partnership project (3GPP) $5^{th}$ Generation (5G) mobile network core. The method includes starting a container image load, the container image including at least a secret sub unit and an application sub unit, the application sub unit providing the SMF, determining an input source to provide a secret value for the container, the input source identified by information in the secret sub unit in the container image, and providing the secret value to a destination sub unit of the container.

20 Claims, 9 Drawing Sheets

(51) Int. Cl.
*G06F 21/12* (2013.01)
*G06F 21/30* (2013.01)
*G06F 21/44* (2013.01)
*H04W 8/08* (2009.01)
*H04W 12/122* (2021.01)
*H04W 48/16* (2009.01)
*H04W 80/10* (2009.01)

(52) U.S. Cl.
CPC .......... *G06F 9/45533* (2013.01); *G06F 21/00* (2013.01); *G06F 21/12* (2013.01); *G06F 21/121* (2013.01); *G06F 21/30* (2013.01); *G06F 21/445* (2013.01); *H04W 8/08* (2013.01); *H04W 12/122* (2021.01); *H04W 48/16* (2013.01); *H04W 80/10* (2013.01); *G06F 2009/45595* (2013.01)

(58) Field of Classification Search
CPC ........ G06F 21/10; G06F 21/12; G06F 21/121; G06F 21/30; G06F 21/455
See application file for complete search history.

(56) References Cited

U.S. PATENT DOCUMENTS

| | | |
|---|---|---|
| 2016/0219073 A1 | 7/2016 | Mathur et al. |
| 2016/0342786 A1 | 11/2016 | Gerebe |
| 2016/0381075 A1 | 12/2016 | Goyal et al. |
| 2017/0116415 A1 | 4/2017 | Stopel et al. |
| 2017/0177877 A1 | 6/2017 | Suarez et al. |
| 2017/0277524 A1 | 9/2017 | Bhat et al. |
| 2017/0279797 A1 | 9/2017 | Cross et al. |
| 2018/0088993 A1 | 3/2018 | Gerdesmeier et al. |
| 2018/0144123 A1 | 5/2018 | Levin et al. |
| 2018/0196654 A1 | 7/2018 | Bo et al. |
| 2018/0196680 A1 | 7/2018 | Wang et al. |
| 2018/0285156 A1 | 10/2018 | Corey et al. |
| 2018/0357068 A1 | 12/2018 | Ambichl et al. |
| 2018/0359239 A1 | 12/2018 | Schwarz et al. |
| 2019/0028490 A1 | 1/2019 | Chen et al. |
| 2019/0034617 A1* | 1/2019 | Scarlata ............... G06F 9/30007 |
| 2019/0146816 A1 | 5/2019 | Reno et al. |

* cited by examiner

METHOD AND APPARATUS FOR SECRETS INJECTION INTO CONTAINERS FOR 5G NETWORK ELEMENTS

CROSS-REFERENCE TO RELATED APPLICATIONS

This application is a continuation-in-part of U.S. application Ser. No. 15/813,016, filed Nov. 14, 2017 (now U.S. Pat. No. 10,761,871, issued Sep. 1, 2020), which is hereby incorporated by reference.

TECHNICAL FIELD

Embodiments of the invention relate to the field of virtualization using containers in a mobile network core; and more specifically, to a process for container management where there is provisioning for secrets during container instantiation where the containers include network elements of a mobile network core.

BACKGROUND

A platform is an operating environment that may execute on physical and/or virtualized hosts. A physical host is a traditional computing system having physical hardware and an operating system. Virtual hosts are operating environments based on the virtualization of the physical hardware. Virtualization in the area of computing systems is the creation of a virtual (rather than physical) representation of some aspect of the computing system. Operating system level virtualization is an example of virtualization where a server is virtualized often to provide more secure hosting environments in server farms, datacenters, cloud computing or similar distributed computing systems. Operating system level virtualization can securely manage fixed physical computing system resources amongst a set of users. These users may be from competing entities and thus need to have secured execution environments to prevent the other users from gaining access to our interfering with their programs.

A platform can be used to manage a set of separate operating environments as containers, virtualization engines or similar instances. The platform manages the physical computing system resources amongst the set of operating environments. The management of resources can be referred to as a virtualization system. The virtualization system may support a container management system, which is a type of virtualization system that is lightweight (i.e., requires less computational and storage overhead) in comparison to other types of virtualization. The container management system enables any number of containers or similar entities to execute over any number of physical or virtual hosts as part of the platform. These containers are generated from container images, which are a format for defining code that will execute in the container.

Applications running on the platform are executed within containers or similar entities managed by the platform. The containers are a mechanism where applications can be controlled to limit the amount of computing resources utilized by the application during execution. The containers are isolated and controlled lightweight processes running on an operating system or hypervisor. The operating system may be implemented by a physical or virtual host. The containers and the applications they run do not have access to any information about other processes of the host. A container is restricted to a limited set of resources including processor(s), memory, fixed storage and similar resources. The container may be allotted a fixed set of such resources when it is instantiated.

The use of containers provides advantages for running application. The containers can share runtime code with their host operating system and other containers. This makes the containers lightweight (i.e., low resource) and portable such that a large number of containers can run across many hosts as a distributed system and the containers can be moved between hosts for load balancing of the available resources across the set of hosts. However, such distribution and movement of containers across a set of hosts makes the monitoring of the condition and life cycle of the containers more difficult.

The platforms manage and monitor the containers in this distributed environment, which may include thousands of containers running across hundreds of physical and/or virtual hosts. To monitor the status of the containers the platforms and in particular the container management system of the platforms may use a centralized system where everything about the managed containers can be known. These systems load containers which are stored as images. The container images are composed of a number of sub units sometimes referred to as layers or packages that may contain executable code for operating systems, libraries, application programming interfaces (APIs), applications and similar aspects that are to form a container and that define its functionality.

SUMMARY

In one embodiment, a method and system for managing dynamic runtime information provision for a container implementing a Session Management Function (SMF) executed by an electronic device in a $3^{rd}$ generation partnership project (3GPP) $5^{th}$ Generation (5G) mobile network core. The method includes starting a container image load, the container image including at least a secret sub unit and an application sub unit, the application sub unit providing the SMF, determining an input source to provide a secret value for the container, the input source identified by information in the secret sub unit in the container image, and providing the secret value to a destination sub unit of the container.

In another embodiment, a method of managing dynamic runtime information provision for a container implementing an Access and Mobility Management Function (AMF) executed by an electronic device in a 3GPP 5G mobile network core. The method includes starting a container image load, the container image including at least a secret sub unit and an application sub unit, the application sub unit providing the AMF, determining an input source to provide a secret value for the container, the input source identified by information in the secret sub unit in the container image, and providing the secret value to a destination sub unit of the container.

In another embodiment, an electronic device is in a 3GPP 5G mobile network core, the electronic device configured to implement a container management system, the container management system to support managing dynamic runtime information provision for a container implementing an SMF. The electronic device includes a non-transitory computer-readable medium having stored therein a container manager, and a processor coupled to the non-transitory computer-readable medium. The processor executes the container manager. The container manager starts a container image load, the container image including at least a secret sub unit and an application sub unit, the application sub unit providing the SMF, determines an input source to provide a secret value for the container, the input source identified by information in the secret sub unit in the container image, and provides the secret value to a destination sub unit of the container.

In on embodiment, an electronic device in a 3GPP 5G mobile network core, the electronic device configured to implement a container management system, the container management system to support managing dynamic runtime information provision for a container implementing an AMF. The electronic device includes a non-transitory computer-readable medium having stored therein a container manager, and a processor coupled to the non-transitory computer-readable medium. The processor executes the container manager, the container manager starts a container image load, the container image including at least a secret sub unit and an application sub unit, the application sub unit providing the AMF, determines an input source to provide a secret value for the container, the input source identified by information in the secret sub unit in the container image, and provides the secret value to a destination sub unit of the container.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
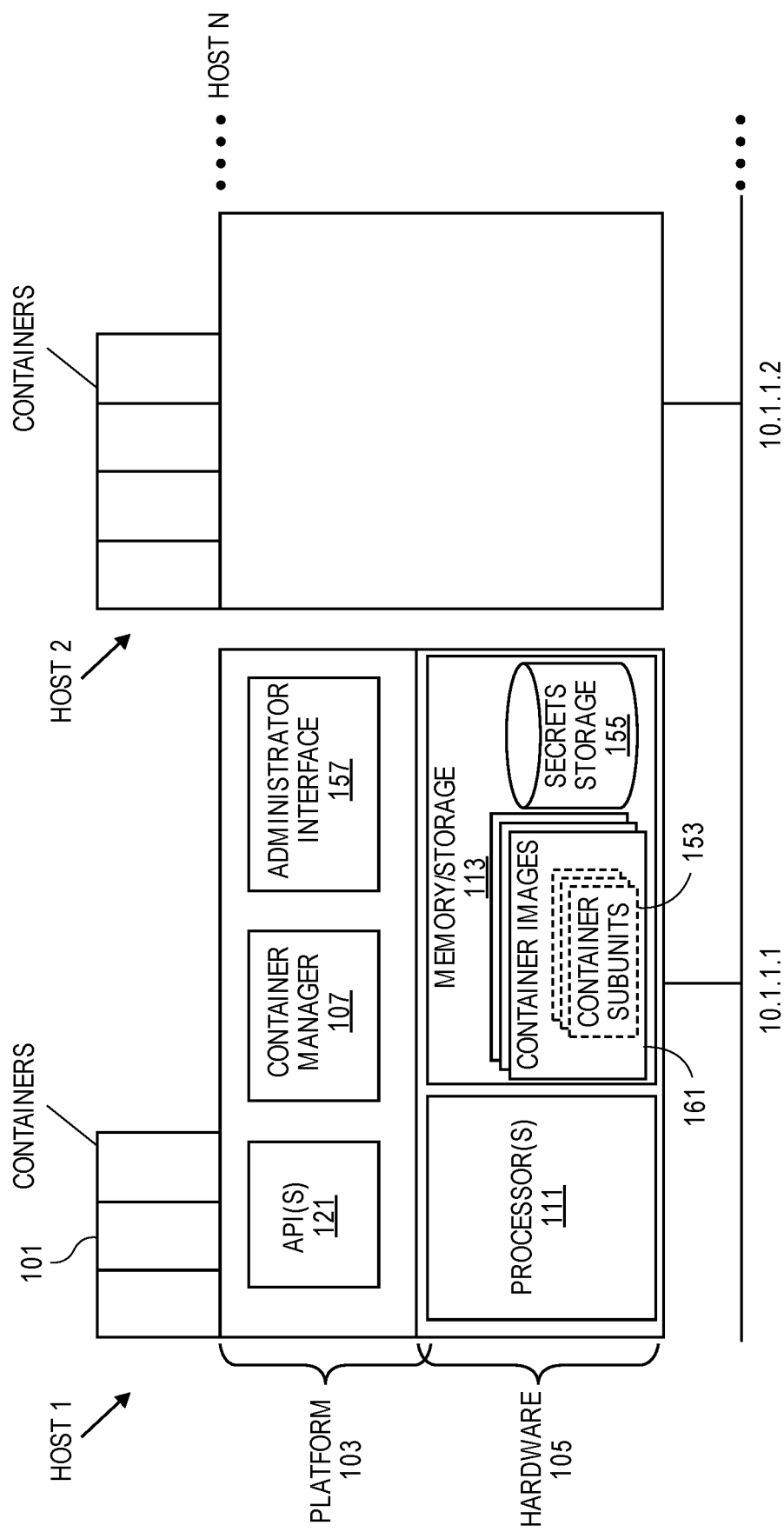
FIG. 1 is a diagram of one embodiment of a network of computing devices functioning as platform including a set of server hosts to manage a set of containers.

The following description describes methods and apparatus for managing the provisioning of secrets to containers that are constructed based on container images that include a secret sub unit where the secret sub unit defines the parameters for determining the requisite secret values at runtime. The embodiments enable dynamic provisioning of secrets whereby the security of the secrets is better maintained and they can be generated in a standardized manner at run time on a per instance basis. In particular the embodiments enable dynamic provisioning of secrets to network elements from a $3^{rd}$ generation partnership project (3GPP) $5^{th}$ generation (5G) mobile network core that are instantiated as sub units of the containers.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device.

Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview of Secret Injection

When running a platform that utilizes containers, some of these containers will require 'secrets' that are determined at runtime. These 'secrets' are data items such as cryptographic keys (e.g., private keys), passcodes or similar data that enables an instance of a container or a component of an instance of a container (e.g., an application) to have a unique secret that is distinct from other instances of the same container image. For example, a web server to be executed in a container may need a private key if it intends to serve transport layer security (TLS)-protected sessions. In other examples, an application running in a container that connects to a database might need a database password.

When the container image is being developed, the developer knows what secrets will be needed and how the container image will consume these secrets. For example, the developer will know that a private key is needed for a web server and that it must appear within the container in a certain file. However, the actual secret value (e.g., a private key value) for any given instance of the container image is not known until runtime, and will usually be different for every instantiation. Furthermore, unlike configuration data, secrets are sensitive and must be protected from unauthorized access. Thus, such secrets cannot form a part of the container image itself both for the dynamic per instance aspect and for the security of the information.

The existing processes for providing secrets to containers have various problems. These processes have security issues, complexity or inconvenience issues and a lack of standardization. The security issues require very careful implementation to avoid exposing the secrets. For example, environment variables related to a container can be unintentionally exposed to other processes within the platform. Also, the container images may not be securely stored, may be commonly available or publicly disseminated or similarly insecure. Thus, the container images cannot protect these secrets and the instantiation of container images does not have safeguards at the container management system to securely provide the secrets. The complexity and inconvenience of current processes involves a lack of automation. The knowledge of what secrets are needed, and how the container image expects these secrets to be provided at runtime is lost between development and operation (runtime.) Therefore, it must be transmitted "out of band." For example, this information must be communicated from developers to operations personnel. This introduces opportunity for errors.

The lack of standardization arises from the development of container images being performed by independent developers. Since there are different ways to inject secrets; different ways to present them; and no standards, the runtime container management system must be unnecessarily complex to handle any of the myriad implementations that developers may employ. The container management system must allow for any secret to be injected in any way to a container image to be instantiated. Operators must have knowledge of the correct approach for each container image. The runtime container management system cannot help the operator or simplify the process because it has no knowledge of the types of secrets each container image requires and the mechanism for their injection.

Container image files are composed of sub units that, when installed over each other, make up the runtime image of the container. In some embodiments, these sub units may be referred to as 'layers' (e.g., in the Docker container management system) or as 'packages' in other container management systems (e.g., the Apcera container management system). The embodiments define a special 'secrets' type of sub unit. These secrets sub units do not contain actual secret values. Rather, the secrets sub unit contain metadata about the secret values required at runtime for the associated container and how the secret values must be presented to container or a designated sub unit of the container.

At runtime (i.e., at the time that a container image is instantiated as a container by the container management system), rather than simply loading or layering the secrets sub unit into the container (as is done with other types of sub units), the container management system will obtain the actual secret values required by the container and arrange them in the container as directed by the metadata of the secrets sub unit. That arrangement might use any possible way to communicate information to the container or container sub unit.

The embodiments support each of the possible mechanisms for secret injection and provide an automated and standardized mechanism for their provision to the container image or container sub unit that requires the secret values. The secret sub unit can identify a place the secret values can be placed in the file system (e.g., on disk or in memory), in environment variables, as command parameters to the container image, or even specify a connection to a running container image using some form of inter-process communication (IPC) or protocol. Secret values can be extracted at runtime from some secret store (e.g., a file or database accessible to the container management system). The secret values can be entered by a user (e.g., by an operator) at the prompting of the container management system based on the defined metadata of the secret sub unit. The secret values can be generated dynamically (for example, a certificate generated or issued.) The secret metadata can enable the runtime container management system to intelligently manage and present the secrets to the operator.

The presence of the secrets sub unit metadata also enables fine-grained policy controls for further security on the secret values. For example, the secrets sub unit can limit certain users or certain jobs access to certain secret values. The secrets sub unit can use different secrets for development versus production jobs. Thus, the embodiments provide an approach that can be generalized for any kind of configuration data or dynamic (runtime-specific) data required by the container.

The embodiments overcome the limitations of the existing processes. The embodiments provide standardization of a basic required operations for running many container functions (e.g., injection of secret or dynamic/configuration data). The embodiments provide better security for the secrets being provisioned by supporting mechanisms for providing secret values without exposing these secret values. The embodiments provide a more robust administration of secret values and management of containers while reducing overall container management system overhead. The embodiments provide standardization and automation to reduce errors in secret provisioning caused by operators having insufficient information about the characteristics of the secret values or configuration data that are required by each container or container sub unit.

FIG. 1 is a diagram of one embodiment of a network of computing devices functioning as a platform including a set of server hosts to manage a set of containers. The FIG. 1 provides one example of a set of computing devices that implement a platform providing a container management system. In other embodiments, the platform may be implemented by a single computing device with any configuration of hardware, while in further embodiments, the components of the platform may be distributed in other combinations and permutations as would be understood by one of skill in the art. In the example embodiment, the computing devices (Host(s) 1-N) are connected with one another over a local area network in this example an L3 network. In other embodiments, the computing devices can be connected over any type of network, interconnect or communication system.

The computing devices (Host(1-N) can have similar or varied computing resources, including differing processing capabilities, storage capabilities and similar physical hardware differences. While the examples are primarily discussed in terms of physical computing devices serving as hosts, one skilled in the art would understand that additional levels of virtualization are possible such that the platform may execute on a set of virtual hosts. For sake of clarity, the hosts are discussed as physical computing devices.

Each of the computing devices includes hardware 105 comprising a set of one or more processor(s) 111 (which can be any type of general purpose of application specific processors), network interface controller(s) (NICs; also known as network interface cards) (which include physical and virtual interfaces), non-transitory machine-readable storage media 113 having stored therein software including the software that implements the embodiments described herein, and similar components. During operation, the processor(s) 111 execute the software to instantiate the platform 103 including any number of constituent components such as a container manager 103, application programming interfaces (APIs) 121, administrator interface 157 and similar components, as well as one or more sets of one or more applications. The embodiments may use different forms of virtualization. For example, in one embodiment the platform may encompass the kernel of an operating system (or a shim executing on a base operating system) that allows for the creation of multiple instances called software containers or simply 'containers' 101 as used herein that may each be used to execute one (or more) of the sets of applications supported by the platform, where the multiple containers 101 (also called virtualization engines, virtual private servers, or jails) are user spaces (typically a virtual memory space) that are separate from each other and separate from the kernel space in which the operating system is run; and where the set of applications running in a given container or user space, unless explicitly allowed, cannot access the memory of the other containers or processes.

In another embodiment, the platform encompasses a hypervisor (sometimes referred to as a virtual machine monitor (VMM)) or a hypervisor executing on top of a host operating system, and each of the sets of applications is run on top of a guest operating system within an instance called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In further embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 105, directly on a hypervisor (in which case the unikernel is sometimes described as running within a LibOS virtual machine), or in a software container, embodiments can be implemented fully with unikernels running directly on a hypervisor represented by platform 103, unikernels running within software containers represented by instances 101, or as a combination of unikernels and the above-described techniques (e.g., unikernels and virtual machines both run directly on a hypervisor, unikernels and sets of applications that are run in different software containers).

While embodiments of the invention are illustrated with reference to containers 101, alternative embodiments may implement the processes and functions described herein at vary levels of granularity such as at a finer level granularity (e.g., line card virtual machines virtualize line cards, control card virtual machine virtualize control cards, etc.); it should be understood that the techniques described herein with reference to container instances also apply to embodiments where such a finer level of granularity and/or unikernels are used.

In certain embodiments, the platform includes a virtual switch that provides similar forwarding services as a physical Ethernet switch. Specifically, this virtual switch forwards traffic between containers 101 or instances and the NIC(s), as well as optionally between the containers 101 or instances; in addition, this virtual switch may enforce network isolation between the various components of the platform that by policy are not permitted to communicate with each other (e.g., by honoring virtual local area networks (VLANs)).

In some embodiments, hosts 1-N may communicate via a virtual network, which is a logical abstraction of a physical network that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

The platform 103, as discussed above, can include various components including a container manager 107, various APIs 121, an administrator interface 157, and similar components. This listing is not intended to be exhaustive, rather it sets forward those components most directly affected by the processes and embodiments described herein. These components can be spread across any combination of the hosts 1-N in any combination and permutation. Some components, such as the container manager 107 may have instances on each host, while others may be present in only a subset of the hosts.

The container manager 107 may be responsible for generating processes and jobs in the platform. The container manager 107 can facilitate the instantiation of applications and containers 101. As discussed further herein below, the container manager 107 may instantiate a container 101 or similar structure (e.g., unikernel or VM) by loading a corresponding container image 151 and its constituent sub units 153.

APIs 121 are sets of functions that applications, user (e.g., via an administrator interface 157 such as a command line interface, terminal or similar interface) and similar entities utilize to request resources of the platform including hardware 105. These functions, when invoked, are often referred to as 'calls' to the API. Some or all of these APIs can be considered secure APIs that require authentication of the requester before the requests are processed. The authentication is generally tied to a set of permissions or an authorization set of a user who has a set of user credentials that in turn can form or generate a user token. The user credentials or user token can be processed by an authentication server (not shown) to verify that the user credential or the user token are valid or authorized.

The platform can support any number of containers 101 distributed across any number of the hosts 1-N and in any distribution or organization of the containers 101. The containers can be fixed to a particular host or can be configured by the platform to be capable of being moved, for example for load balancing, across the set of hosts 1-N. The containers can have varying user space sizes, accessible resources and similar variations in characteristics.

In some embodiments, one or more of the hosts 1-N may store copies of the container images 151 in the local memory or storage 113. The container images 151 can be stored in any location accessible to a container manager 107 to enable the loading of these container images 151 to create a container 101.

In addition, the memory or storage 113 may include a secrets store 155. The secrets store 155 can include any sort of data that may be utilized during container instantiation to generate secret values to be injected to the container 101 or a sub unit of the container. The secrets store 155 can include lists of secret values, cryptographic information, or similar data that can either be used directly to inject a secret value defined by a secret sub unit into a container or can supply the information needed to derive such secret values such as hashing algorithm or similar function that generates values that can be utilized as secret values or as a portion thereof. In further embodiments, the principles, functions and processes described herein may be applied for other types of dynamic configuration of containers at runtime/instantiation. In such cases, the secrets store 155 may be a configuration store or similar data storage that contains any information relevant to a configuration or operation of a container that is dynamic (i.e., must be configured at runtime rather than during development) and/or instance specific.

Figure 2:
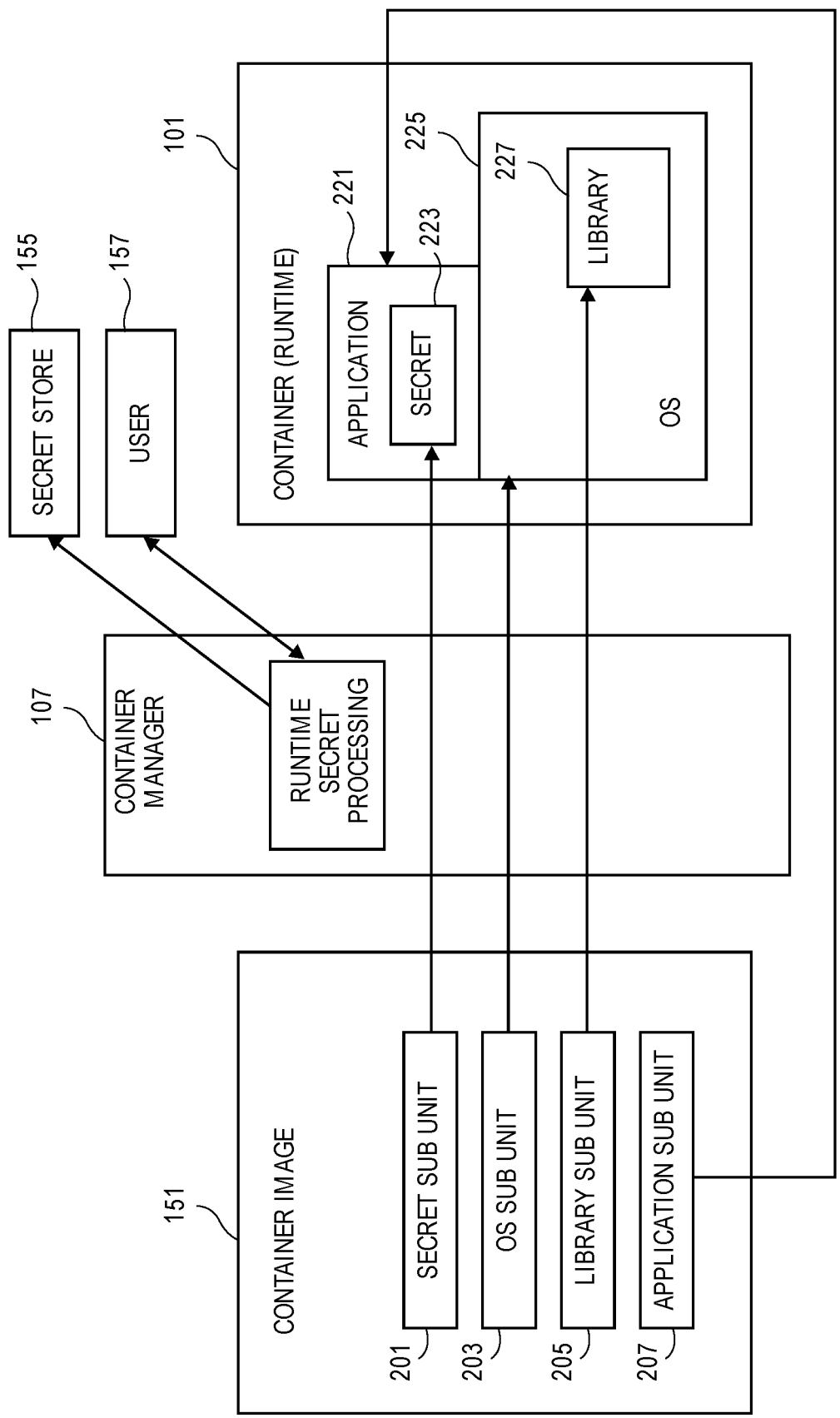
FIG. 2 is a diagram of one embodiment of a container image being processed to instantiate a container with a secrets sub unit.

FIG. 2 is a diagram of one embodiment of a process of generating a container from a container image. The process illustrates the manner in which a container manager 107 generates a container 101 to be executed by the platform from a container image 151. The container manager 107 may initiate the generation of a container 101 in response to a request from an administrator via an administrator interface 157 or via any similar process. A container image 151 is composed of any number of sub units. These sub units are either code or references to code that are loaded by the container manager 101 into a user space to be executed by the platform. The container manager 107 thus follows the 'recipe' defined by the container image 151 to create the container 101. Any number of containers 101 can be generated from a single container image 151. The embodiments enable each of these containers 101 generated from the same container image 151 to have different configuration (i.e., separate secret values or similar dynamic configuration at runtime). The types of sub units can include operating system (OS) sub units 203, library sub units 205, application sub unit 207 and secret (or dynamic configuration) sub unit 201. Any number, combination or sub set of sub units can be included in a given container image 151. The types of sub units described with reference to this example are by way of illustration and not limitation. One skilled in the art would appreciate that there may be any number of other types of sub units that may be defined in conjunction with a container image 151.

An OS sub unit 203 can include code or references to code related to an operating system or portion of an operating system such as a kernel. The OS sub unit 203 can similarly define or reference functions or interfaces of an operating system. A library sub unit 205 can define or reference a programming or code library in its entirety or any sub-set of the library as may be utilized by the container or the other components (sub-units) of the container 101. An application sub unit may define an application (i.e., a program or set of functions) to be executed as part of the container 101. A separate application sub unit may be defined for each application to be placed in the container or in some embodiments, multiple applications can be defined or referenced by a single application sub unit.

A secret sub unit 201 can define a set of secret information that is required by the container including secret information required by other sub units. In other embodiments, the secret sub unit 201 can define any dynamic runtime configuration information and can be referred to as a configuration sub unit. The secret sub unit 201 can have a standardized format that may specify a process for generating the required secret values, how to provide or input these secret values, the sub units utilizing the secret values and similar information. The secret sub units can be processed by a runtime secret processing component 211 in the container manager 107 or a similar component.

The runtime secret processing component 211 can access the metadata and information of the secret sub unit 201 and generate the secret values required as well as inject them into the container 101 or the container components such as an application 221 (shown with an injected secret 223 for example), the operating system 225 or component thereof, if present in the container, a library 227 or similar component of the container 101. In some embodiments, the container manager 107 and the runtime secret processing component 211 can retrieve secret related data from a secret store 155 where specified by a secret sub unit 201. Similarly, the secret sub unit 201 can define information that is to be input by a user/administrator and the runtime secret processing component 211 can interact with the administrator interface to query a user for the requisite information to generate the secret values to be injected into the container 101 or its components.

One skilled in the art would appreciate, that the same process and function can be applied to an embodiment where the secret sub unit 201 defines dynamic configuration requirements (i.e., where there is a configuration sub unit). The processes, components and functions described with relation to secret injection are also applicable and adaptable to dynamic runtime configuration of a container 101 and its components.

In one example embodiment, a secret sub unit may be defined in JavaScript Object Notation (JSON). This example is provided by way of illustration and not limitations. One skilled in the art would understand that the secret sub unit can be implemented with other formats and using other notations or languages.

```
secrets: {
    secret: {
        name: "TLS Key",
        type: "RSA_PRIVATE_KEY",
        format: "BASE64",
```

-continued

```
        destination: {
            type: "ENVIRONMENT VARIABLE",
            name: "TLS_KEY"
        }
        prompt: "Please enter the Base64-encoded server
        private key for TLS"
    },
    secret: {
        name: "DB Password",
        type: "Clear Text",
        format: "String",
        destination: {
            type: "file",
            name: "/usr/var/app/dbpwfile"
        }
        prompt: "Please enter the database password"
    }
}
```

In this example, a secret sub unit defines a set of secret values that are to be determined. For each secret value a 'name,' type,"format,"destination,' and 'prompt' are defined. The name of the first secret value is the 'TLS Key' and the second secret value name is the 'DB Password.' The first secret value type is 'RSA_Private_Key' (i.e., a cryptographic key) and the second is clear text. The first secret value type is 'Base64' (i.e., an ASCII encoding of the key) and the second is a string. The first and second secret values define a destination where each destination includes a type and name. The first and second secret values also define strings to be presented as prompts where the data to be obtained is from a user via an administrative input. In other embodiments, other fields can be defined such as input sources like secret stores or algorithms either by reference or explicitly within the secret sub unit.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 3:
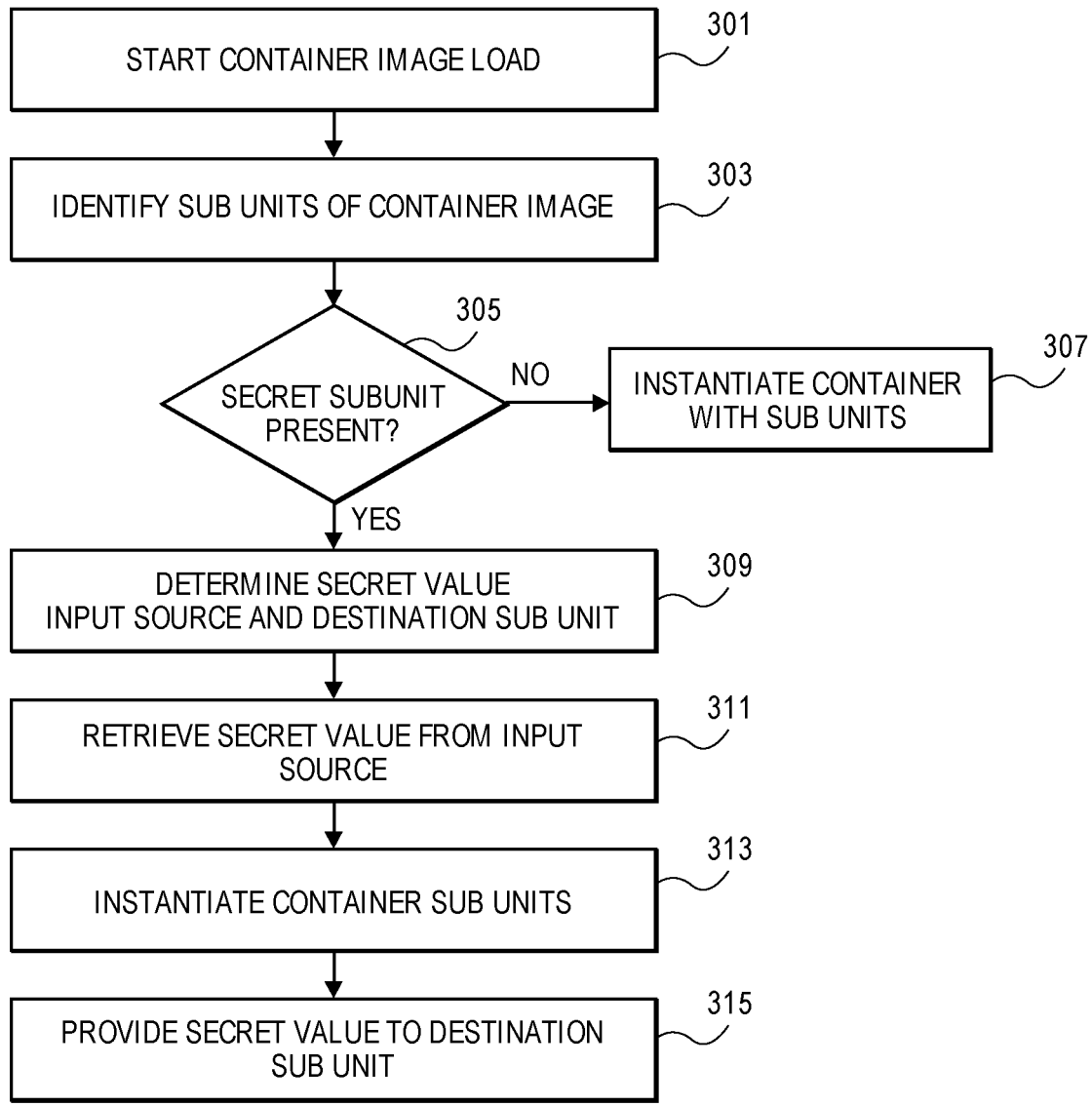
FIG. 3 is a flowchart of one embodiment of a process for container instantiation that supports secrets injection.

FIG. 3 is a process for runtime secret processing to support container instantiation from a container image. In some embodiments, this process is implemented by the container manager. In other embodiments, other components of the container management system or sub-components such as a runtime secret processing component may perform any number or arrangement of these functions. In on embodiment, the process is initiated in response to a request to instantiate a container and to load the associated container image (Block 301). The container image may be stored local to or remotely from the container manager. The container image may be stored in a single location or its storage may be distributed over any number of storage devices. Once the container image is loaded or as it is loaded, the process can identify the sub units that are a part of the container image. (Block 303). A given container image can have any number or variety of sub units (i.e., referred to as packages or layers in some implementations). The sub units can be loaded into a container or loaded to form a container on the container management system.

In some embodiments, a check is made to determine whether the set of sub units for a container to be instantiated include one or more secret sub units (or where the embodiments support dynamic configuration the sub units may be referred to as configuration sub units) (Block 305). If there are no secret (or configuration) sub units, then the process can continue with the instantiation of the container with the defined sub units (Block 307). If there are secret sub units, then the process may load the secret sub unit and access the meta data stored therein to determine a number and type of secret values (or configuration parameters) to be determined including the source of the secret values (configuration parameters) and the destination of the secret values (configuration parameters) (Block 309). For example, a secret sub unit may identify a secret store or similar storage location with a set of secret values or similar data to enable the derivation of the secret information. In other examples, a set of secret values may be defined to be determined based on a specified algorithm. The process then generates or retrieves the secret values from the sources (i.e., a storage location, derivation or similar process) (Block 311). In further embodiments, the determination of the secret values can include generation of a query or similar interaction with a user such as an administrator to receive some portion of the secret value or information to be utilized in the generation of the secret value such as a seed for a number generation algorithm. The process can use any combination of stored, user supplied or derived information to generate the secrets required by the secret sub unit.

Once the secret values have been determined in accord with the definition of the secret sub unit (or the dynamic configuration information has been similarly determined), then the process can complete the instantiation of the other container sub units (Block 313). In other embodiments, the other sub units can be loaded and/or instantiated in parallel or before the secret sub unit and secret value determination. The secret values can be provided to a target destination as defined by the secret sub unit (Block 315). The target can be any component or sub unit of the container being instantiated. The secret values can be provided by any communication mechanism such as via an inter-process communication, message, input parameter or similar mechanism for passing the secret information to the sub unit or similar component of a container.

In this manner, a secret sub unit can define a standardized method and format for determining secret values at run time and on a per instance basis. This process can be repeated for each instance of a container image that is being generated as a container thereby providing separate unique values to each container in the manner that is standardized for the container manager. This avoids differing approaches that may be defined entirely by developers that are not standardized and do not protect secrecy of the information on a per instance basis for each container.

Figure 4:
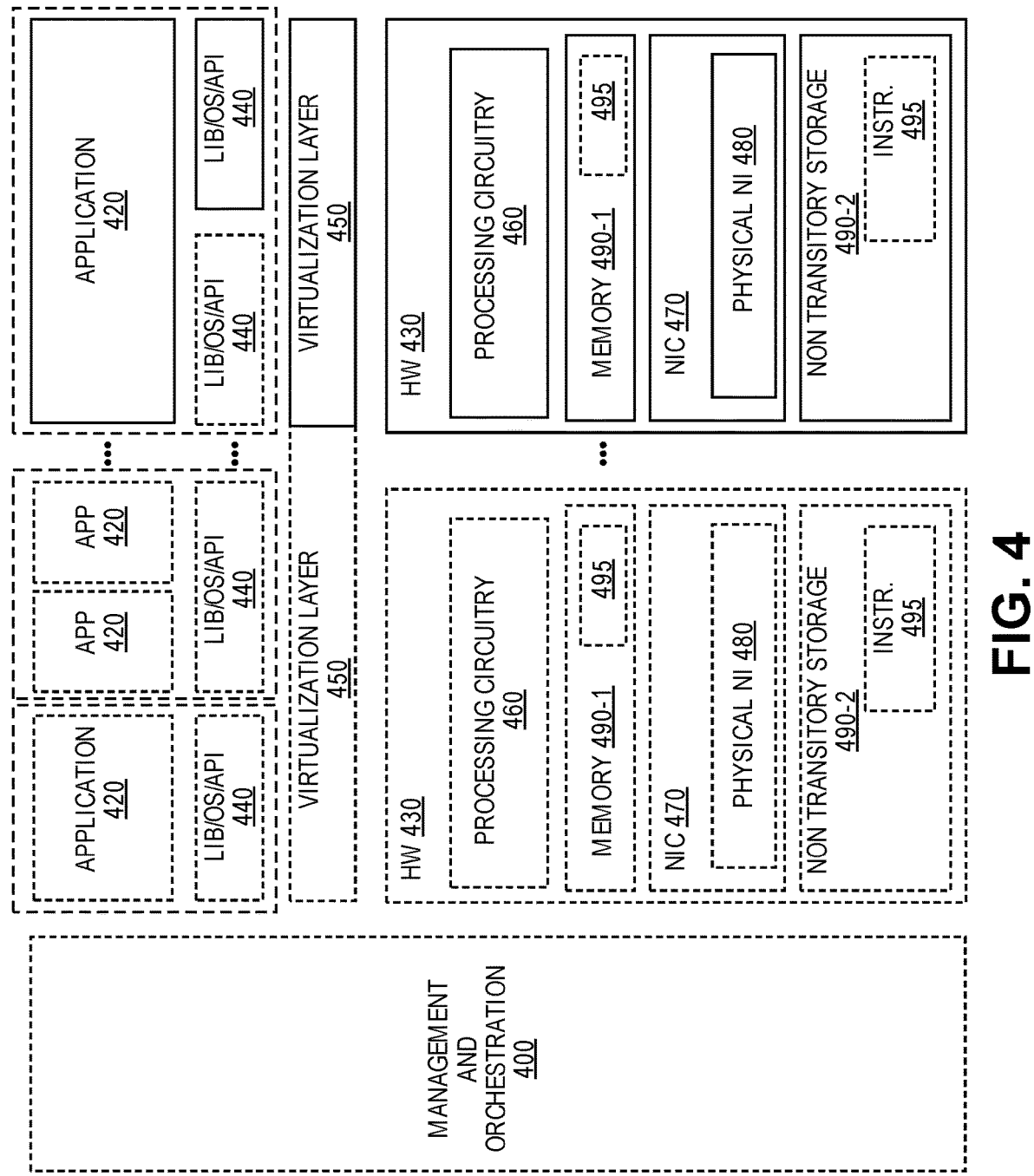
FIG. 4 is a diagram of one example of a virtualized operating environment for the embodiments.

FIG. 4 is a schematic block diagram illustrating a virtualization environment in which functions implemented by some embodiments may be virtualized. As discussed further herein above, in the present context, virtualizing means creating virtual versions of apparatuses or devices which may include virtualizing hardware platforms, storage devices and networking resources. As used herein, virtualization can be applied to provide a platform that executes over a set of physical hardware components and relates to an implementation in which at least a portion of the functionality is implemented as one or more virtual components (e.g., via one or more applications, components, functions, virtual machines or containers executing on one or more physical processing components).

In some embodiments, some or all of the functions described herein may be implemented as virtual components executed by one or more containers or virtual machines implemented in one or more virtual environments 400 hosted by one or more of hardware components 430.

The functions of the embodiments may be implemented as part of the virtualization layer 450, which supports one or more applications 420 (which may alternatively be called software instances, virtual appliances, network functions, virtual nodes, virtual network functions, or the like) operative to implement features, functions, and/or benefits of any type of program. Applications 420 are run in virtualization environment 400 such as containers which isolate the applications from hardware 430 comprising processing circuitry 460 and memory 490. Memory 490 contains instructions 495 executable by processing circuitry 460 whereby applications 420 can be executed as part of the virtualization environment 400.

The virtualization layer 450 can be executed by general-purpose or special-purpose network hardware devices 430 that may include a set of one or more processors or processing circuitry 460, which may be commercial off-the-shelf (COTS) processors, dedicated Application Specific Integrated Circuits (ASICs), or any other type of processing circuitry including digital or analog hardware components or special purpose processors. Each hardware device may comprise memory 490-1 which may be non-persistent memory for temporarily storing instructions 495 or software executed by processing circuitry 460. Each hardware device may include one or more network interface controllers (NICs) 470, also known as network interface cards, which include physical network interface 480. Each hardware device may also include non-transitory, persistent, machine-readable storage media 490-2 having stored therein software 495 and/or instructions executable by processing circuitry 460. Software 495 may include any type of software including software for instantiating one or more virtualization layers 450 (also referred to as hypervisors), software to execute virtual machines 440 as well as software allowing it to execute functions, features and/or benefits described in relation with some embodiments described herein.

Containers 400 may include the applications 420 and other sub units 440, that support virtual processing, virtual memory, virtual networking or interface and virtual storage, and may be run by a corresponding virtualization layer 450 or hypervisor. Different embodiments of the instances of applications 420 may be implemented within one or more of virtual machines or containers 400, and the implementations may be made in different ways.

During operation, processing circuitry 460 executes software 495 to instantiate the hypervisor or virtualization layer 450, which may sometimes be referred to as a virtual machine monitor (VMM). Virtualization layer 450 may present a virtual operating platform or container management system.

As shown in FIG. 4, hardware 430 may be a standalone network node with generic or specific components. Hardware 430 may include any hardware components and may implement some functions via virtualization. Alternatively, hardware 430 may be part of a larger cluster of hardware (e.g. such as in a data center or customer premise equipment (CPE)) where many hardware nodes work together and are managed via management and orchestration (MANO) 400, which, among others, oversees lifecycle management of applications 420.

Secret Injection for 5G Mobile Network Core Network Elements

Figure 5:
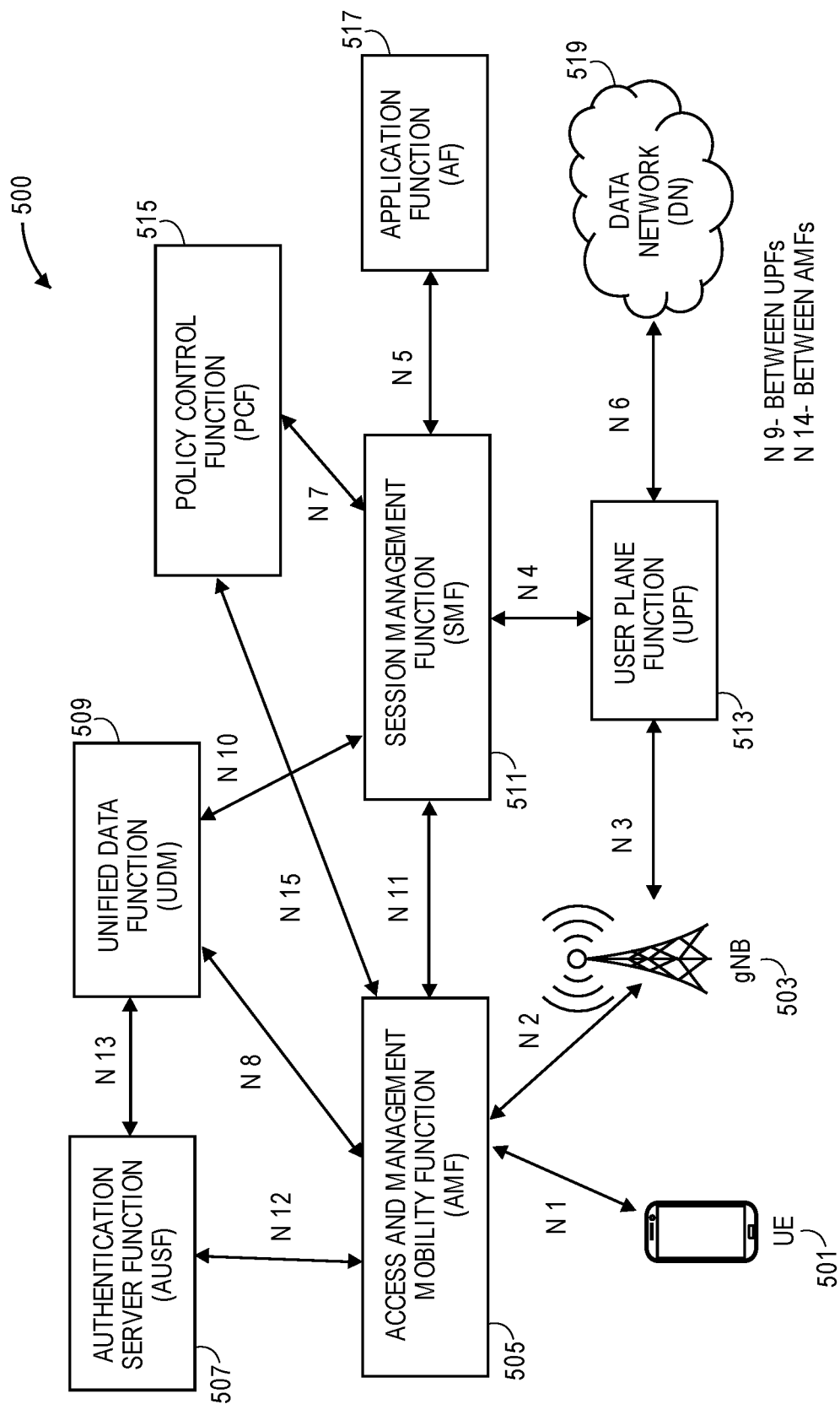
FIG. 5 is a diagram of one example of a $3^{rd}$ generation partnership project (3GPP) $5^{th}$ generation (5G) mobile network.

FIG. 5 is a diagram of one example of a $3^{rd}$ generation partnership project (3GPP) $5^{th}$ generation (5G) mobile network. In some embodiments, the injection of secrets into containers can be utilized with the functions of a 5G mobile network, in particular the network elements of the 5G mobile network core 500. The network elements are the functions and operations of the 5G mobile network core 500, a set of the network elements, as illustrated, are provided by way of example and not limitation. One skilled in the art would understand that the embodiments can be utilized in combination with other network elements, functions and process, including those of prior mobile networking technologies such as 4G long term evolution (LTE), and similar technologies. The example 5G mobile network core 500 can be consistent with the "System Architecture for the 5G System" as defined in TS 23.501 by 3GPP or as defined in similar standards.

In the example embodiments, the 5G mobile network core 500 enables communication of a user equipment (UE) with other UEs and electronic devices communicatively connected to the 5G mobile network core 500 or with electronic devices connected to the data network 519 via the 5G mobile network core 500. The 5G mobile network core 500 includes a number of functions that can be distributed over any number and combination of electronic devices including the electronic devices of a base station, radio access network (RAN), and other devices in the 5G mobile network core 500. For sake of clarity and conciseness, the example of a single UE 501 connected to the 5G mobile network core 500 is provided, where the UE 501 connects to the 5G mobile network core 500 via the RAN including the next generation node basestation (gNodeB) 503 and similar components of the RAN. The RAN can include any number of gNodeBs 503 that service any number of UEs 501.

The UE 501 connects to the 5G mobile network core 500 via the gNodeB 503. Specifically, the UE 501 connects to the access and mobility management function (AMF) 505. The functions and services of the 5G mobile network core 500 communicate via a set of interfaces or reference points (e.g., N1-N14). The reference points can be point to point interfaces that interconnect the network functions where particular signaling procedures can be defined for each point to point interface. Some network functions can be connected via service interfaces or a common bus architecture. For sake of clarity and conciseness some of the details of the communication of the components of the 5G mobile network core 500 are omitted. Those skilled in the art would understand the operation of possible communication mechanisms, e.g., as defined in TS 23.501, between the components of the 5G mobile network core 500 as described herein.

The AMF 505 is responsible for the termination of the non-access stratum (NAS) N1 reference point including NAS ciphering and integrity protection, mobility management, lawful intercept (e.g., for AMF events), serving as a transparent proxy for routing access authentication and SM messages, access authentication, access authorization, security anchor function (SEA), security context management (SCM), and similar functions. In this regard, N2 is the reference point between the gNodeB 503 (and the RAN) and the AMF 505.

The user plane function (UPF) 513 is connected to the gNodeB 503 (i.e., via reference point N3) and the session management function (SMF) 511 (i.e., via reference point N4). The UPF 513 functions include quality of service (QoS) handling for user plane data, packet routing and forwarding, packet inspection and policy rule enforcement, lawful intercept (e.g., of the user plane), traffic accounting and reporting, serving as an anchor point for intra-/inter-radio access technologies mobility, facilitating interaction with external data networks 519 for transport of signaling for protocol data unit (PDU) session authorization/authentication by the external data network 519, and similar functions.

The session management control function (SMF) 511 is connected to the AMF 505 via the N11 reference point and to the UPF via the N4 reference point. The SMF 511 functions include session management, UE Internet Protocol (IP) address allocation and management (including optional authorization), selection and control of user plane functions, termination of interfaces (i.e., reference point N7) towards policy control and charging functions (PCF) 515, control of parts of policy enforcement and QoS, lawful intercept (for Session Management events, interface to lawful intercept system (not shown)), termination of Session Management parts of NAS messages, downlink data notification, initiator of Access Node specific Session Management information, sent via AMF 505 over N2 to Access Node (e.g., gNodeB 503), roaming functionality, handling local enforcement to apply QoS service level agreements (SLAs) (e.g., visited public land mobile network (VPLMN)), charging data collection and charging interface (e.g., VPLMN), lawful intercept (in VPLMN for Session Management events and interface to lawful intercept system), and similar functions.

The data network 519 can be any number or variety of external networks of any size or configuration. The data network 519 can provide mobile network operator (MNO) services, Internet access, and similar functions and services to the 5G mobile network core 500. The data network 519 is connected to the UPF via reference point N6.

The authentication server function (AUSF) 507 is connected to the AMF 505 via reference point N12 and the unified data management function (UDM) via reference point N13. The AUSF 507 performs authentication processes with the UE 501. The unified data management function supports authentication credential repository and processing function (ARPF) (not shown), this function stores the long-term security credentials used in authentication, storing of subscription information, and similar functions.

The UDM 509 is connected to the AUSF 507 via the interface N13 and to the SMF 511 via the interface N10. The UDM 509 manages network user data. The UDM 509 can be paired with a user data repository (UDR) (not shown), which stores the user data such as customer profile information, customer authentication information, and encryption keys. The UDM is connected to the SMF 511 via the N10 reference point, to the AUSF 507 via N13 reference point, and to the AMF 505 via the N8 reference point.

The policy control function (PCF) 515 is connected to the SMF 511 via the interface N7 and the AMF 505 via the reference point N15. The PCF 515 provides support of unified policy framework to govern network behavior, policy rules to control plane function(s) that enforce them, and similar functions.

The application function (AF) 517 is connected to the SMF 511 via reference point N5. The AF 517 requests dynamic policies and/or charging control, and performs similar functions.

Additional reference points include N9 between instances of UPFs 513 and N14 between instances of AMFs 505.

The use of containers in a 5G mobile network core 500 can have a number of advantages including cost savings. Compared to the use of virtual machines, the containers use less hardware resources, because they do not rely on a full operating system to support the operation of the containers.

In addition, containers have faster startup times, require less maintenance, and are portable relative to virtual machines. Containers can execute on any Linux or similar host.

The 5G mobile network core 500, as defined by 3GPP, utilizes cloud-aligned, service-based architecture (SBA) that spans across all 5G network elements and similar functions and interactions including authentication, security, session management and aggregation of traffic from end devices. The 5G mobile network core 500 further supports NFV as an integral design concept with virtualized software functions capable of being deployed using the multi-access edge computing (MEC) infrastructure that is utilized with 5G mobile network architectural principles. A carrier-grade 5G mobile network core can be deployed on containers provided the entire container ecosystem is deployed using well-defined APIs.

5G mobile networks support security features detailed by the 3GPP standards including unified authentication to decouple authentication from access points, extensible authentication protocols to accommodate secure transactions, flexible security policies to address more use cases and subscriber permanent identifiers (SUPI) to ensure privacy on the network. The embodiments support these security features with secrets injection that is extend to 5G mobile network core functionalities that are containerized.

Figure 6:
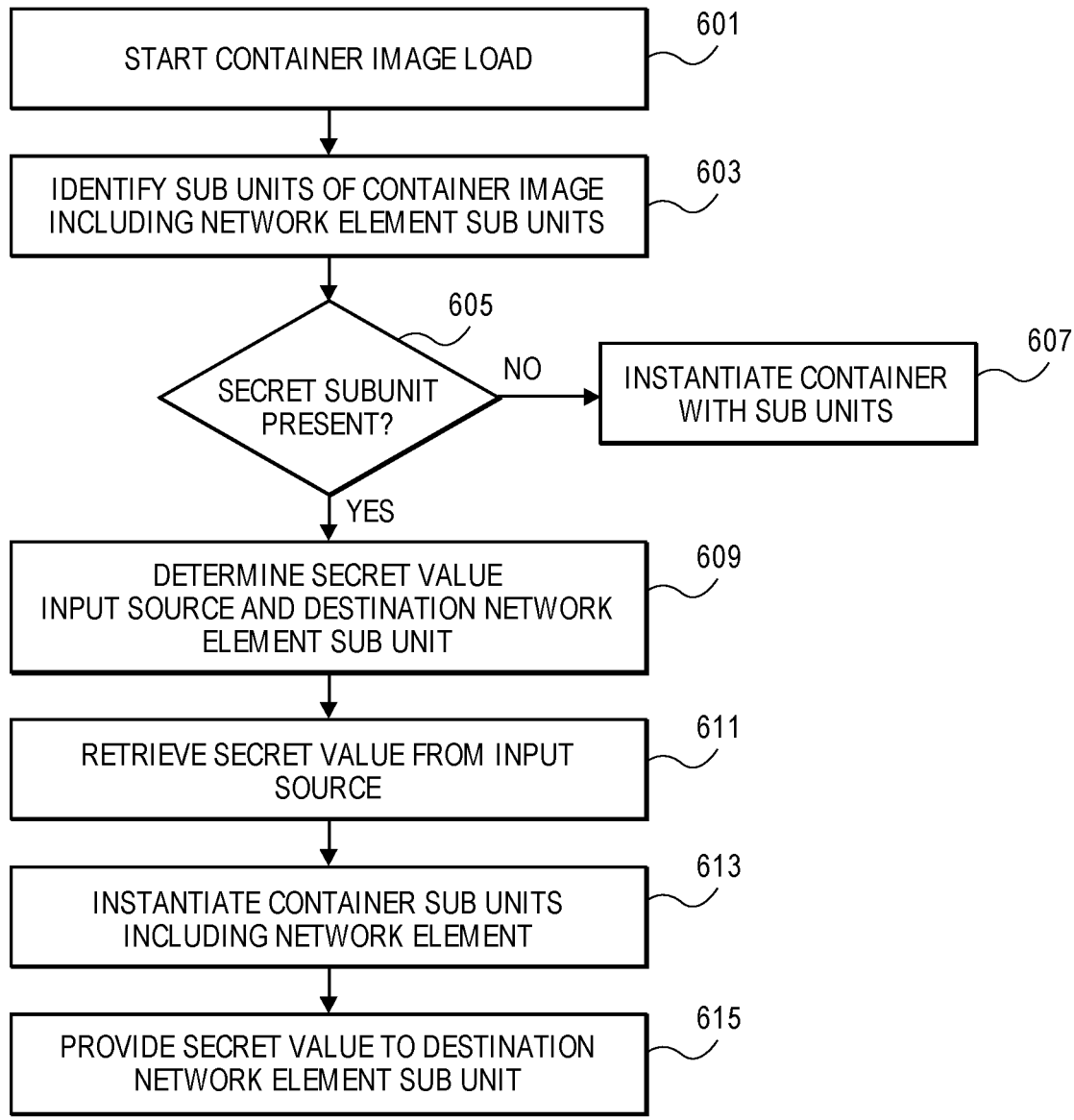
FIG. 6 is a flowchart of one embodiment of a process for secret injection for 5G functions.

FIG. 6 is a flowchart of one embodiment of a process for secret injection for network elements in a 5G mobile network core. In some embodiments, this process is implemented by the container manager. In other embodiments, other components of the container management system or sub-components such as a runtime secret processing component may perform any number or arrangement of these functions. In one embodiment, the process is initiated in response to a request to instantiate a container and to load the associated container image (Block 601). This process can be initiated by any process on any electronic device within the 5G mobile network core. The container manager can be executed by any electronic device within the 5G mobile network core. The container image may be stored local to or remotely from the container manager. The container image may be stored in a single location or its storage may be distributed over any number of storage devices within the 5G mobile network core or in communication therewith. Once the container image is loaded or as it is loaded, the process can identify the sub units that are a part of the container image (Block 603). A given container image can have any number or variety of sub units (i.e., referred to as packages or layers in some implementations). The sub units can be loaded into a container or loaded to form a container on the container management system. The sub units can include network element sub unit that implement the various network elements and functions as described herein including, but not limited to, an AMF, SMF, AUSF, UDM, PCF, AF, UPF, and similar network elements.

In some embodiments, a check is made to determine whether the set of sub units for a container to be instantiated include one or more secret sub units (or where the embodiments support dynamic configuration the sub units may be referred to as configuration sub units) (Block 605). If there are no secret (or configuration) sub units, then the process can continue with the instantiation of the container with the defined sub units (Block 607). If there are secret sub units, then the process may load the secret sub unit and access the meta data stored therein to determine a number and type of secret values (or configuration parameters) to be determined including the source of the secret values (configuration parameters) and the destination of the secret values (configuration parameters) (Block 609). For example, a secret sub unit may identify a secret store or similar storage location with a set of secret values or similar data to enable the derivation of the secret information that is within the 5G mobile network core or accessible to the network elements of the 5G mobile network core. In other examples, a set of secret values may be defined to be determined based on a specified algorithm. The process then generates or retrieves the secret values from the sources (i.e., a storage location, derivation or similar process) (Block 611). The algorithm, location, derivation, or related process can be configured by the MNO or can be specific to the MNO In further embodiments, the determination of the secret values can include generation of a query or similar interaction with a user such as an administrator to receive some portion of the secret value or information to be utilized in the generation of the secret value such as a seed for a number generation algorithm. The process can use any combination of stored, user supplied or derived information to generate the secrets required by the secret sub unit.

Once the secret values have been determined in accord with the definition of the secret sub unit (or the dynamic configuration information has been similarly determined), then the process can complete the instantiation of the other container sub units including any one or more of the network element sub units (Block 613). In other embodiments, the other sub units can be loaded and/or instantiated in parallel or before the secret sub unit and secret value determination. The secret values can be provided to a target destination as defined by the secret sub unit (Block 615). The target can be any component or sub unit of the container being instantiated. In these example embodiments, the destination sub units are network element sub units (e.g., an AMF, SMF, AUSF, UDM, PCF, AF, UPF). The secret values can be provided by any communication mechanism such as via an inter-process communication, message, input parameter or similar mechanism for passing the secret information to the sub unit or similar component of a container.

In this manner, a secret sub unit can define a standardized method and format for determining secret values at run time and on a per instance basis. This process can be repeated for each instance of a container image that is being generated as a container thereby providing separate unique values to each container and for each destination sub unit in a container in the manner that is standardized for the container manager. This avoids differing approaches that may be defined entirely by developers that are not standardized and do not protect secrecy of the information on a per instance basis for each container. In some embodiments, the process can be used to configure and ensure that a secret is unique to a network element or container within the 5G mobile network core.

Figure 7A:
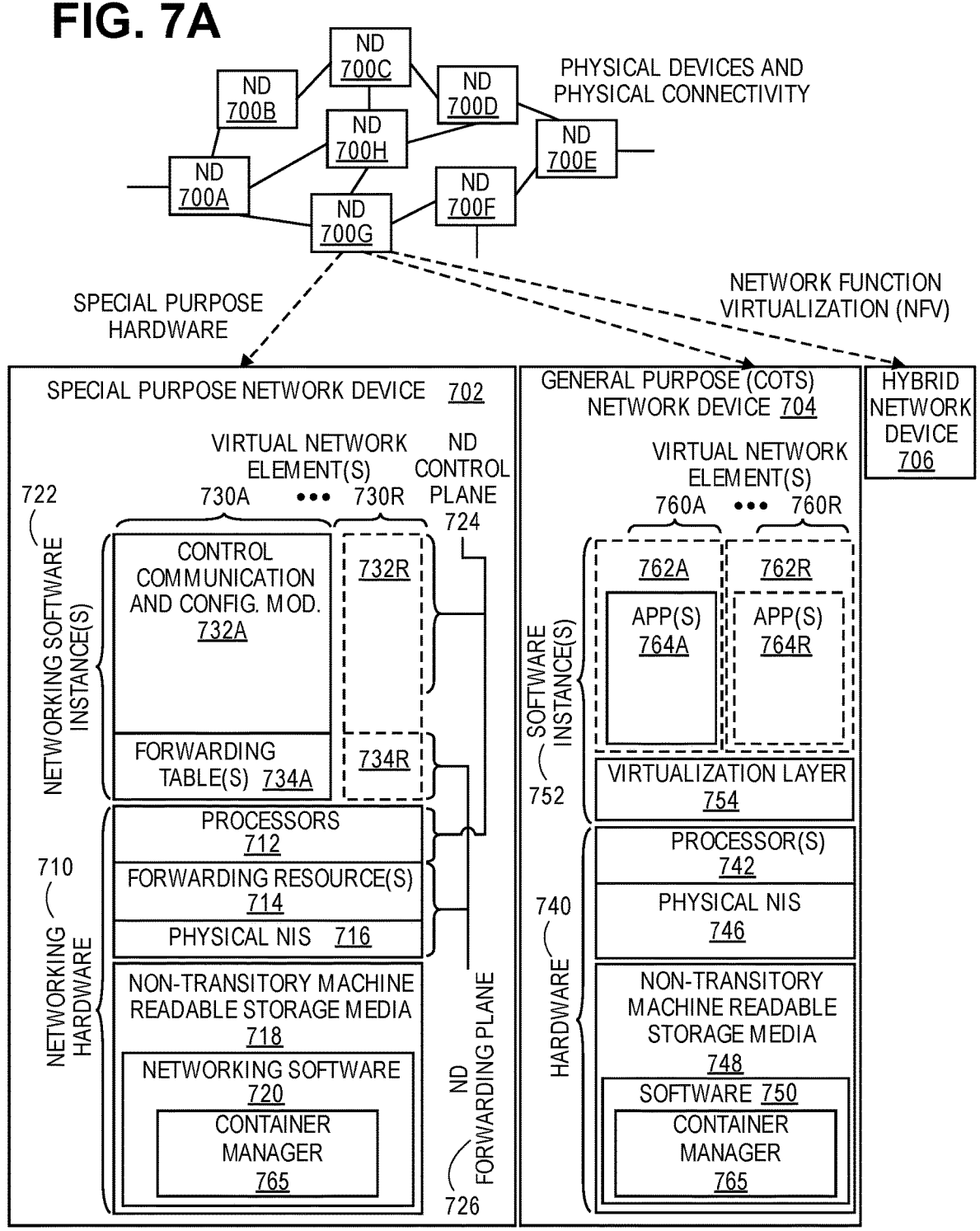
FIG. 7A illustrates connectivity between network devices (NDs) within an exemplary network, as well as three exemplary implementations of the NDs, according to some embodiments of the invention.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between 700A-700B, 700B-700C, 700C-700D, 700D-700E, 700E-700F, 700F-700G, and 700A-700G, as well as between 700H and each of 700A, 700C, 700D, and 700G. These NDs are physical devices, and the connectivity between these NDs can be wireless or wired (often referred to as a link). An additional line extending from NDs 700A, 700E, and 700F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application—specific integrated—circuits (ASICs) and a special-purpose network operating system (OS); and 2) a general purpose network device 704 that uses common off-the-shelf (COTS) processors and a standard OS.

The special-purpose network device 702 includes networking hardware 710 comprising a set of one or more processor(s) 712, forwarding resource(s) 714 (which typically include one or more ASICs and/or network processors), and physical network interfaces (NIs) 716 (through which network connections are made, such as those shown by the connectivity between NDs 700A-H), as well as non-transitory machine readable storage media 718 having stored therein networking software 720. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

In some embodiments, the networking software 720 can include the container manager 765 and similar elements of the embodiments. The container manager 765 can execute on processors 712 and similar hardware 710.

The special-purpose network device 702 is often physically and/or logically considered to include: 1) a ND control plane 724 (sometimes referred to as a control plane) comprising the processor(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the processor(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

Figure 7B:
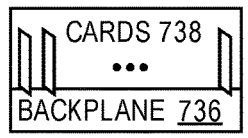
FIG. 7B illustrates an exemplary way to implement a special-purpose network device according to some embodiments of the invention.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and physical NIs 746, as well as non-transitory machine readable storage media 748 having stored therein software 750. During operation, the processor(s) 742 execute the software 750 to instantiate one or more sets of one or more applications 764A-R. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 754 represents a hypervisor (sometimes referred to as a virtual machine monitor (VMM)) or a hypervisor executing on top of a host operating system, and each of the sets of applications 764A-R is run on top of a guest operating system within an instance 762A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-

R, or as a combination of unikernels and the above-described techniques (e.g., unikernels and virtual machines both run directly on a hypervisor, unikernels and sets of applications that are run in different software containers).

In some embodiments, the software 750 can include the container manager 765 and similar elements of the embodiments. The container manager 765 can execute on processors 742 and similar hardware 740.

The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual network element(s) 760A-R.

The virtual network element(s) 760A-R perform similar functionality to the virtual network element(s) 730A-R—e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 762A-R to VNEs also apply to embodiments where such a finer level of granularity and/or unikernels are used.

In certain embodiments, the virtualization layer 754 includes a virtual switch that provides similar forwarding services as a physical Ethernet switch. Specifically, this virtual switch forwards traffic between instances 762A-R and the physical NI(s) 746, as well as optionally between the instances 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 7C:
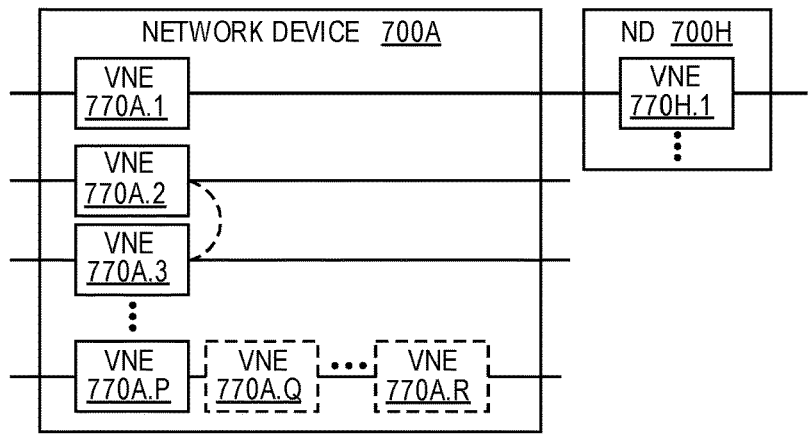
FIG. 7C illustrates various exemplary ways in which virtual network elements (VNEs) may be coupled according to some embodiments of the invention.

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service—e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software instances 762A-R may operate as servers; the same would be true for the hybrid network device 706; in the case of the special-purpose network device 702, one or more such servers could also be run on a virtualization layer executed by the processor(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 7D:
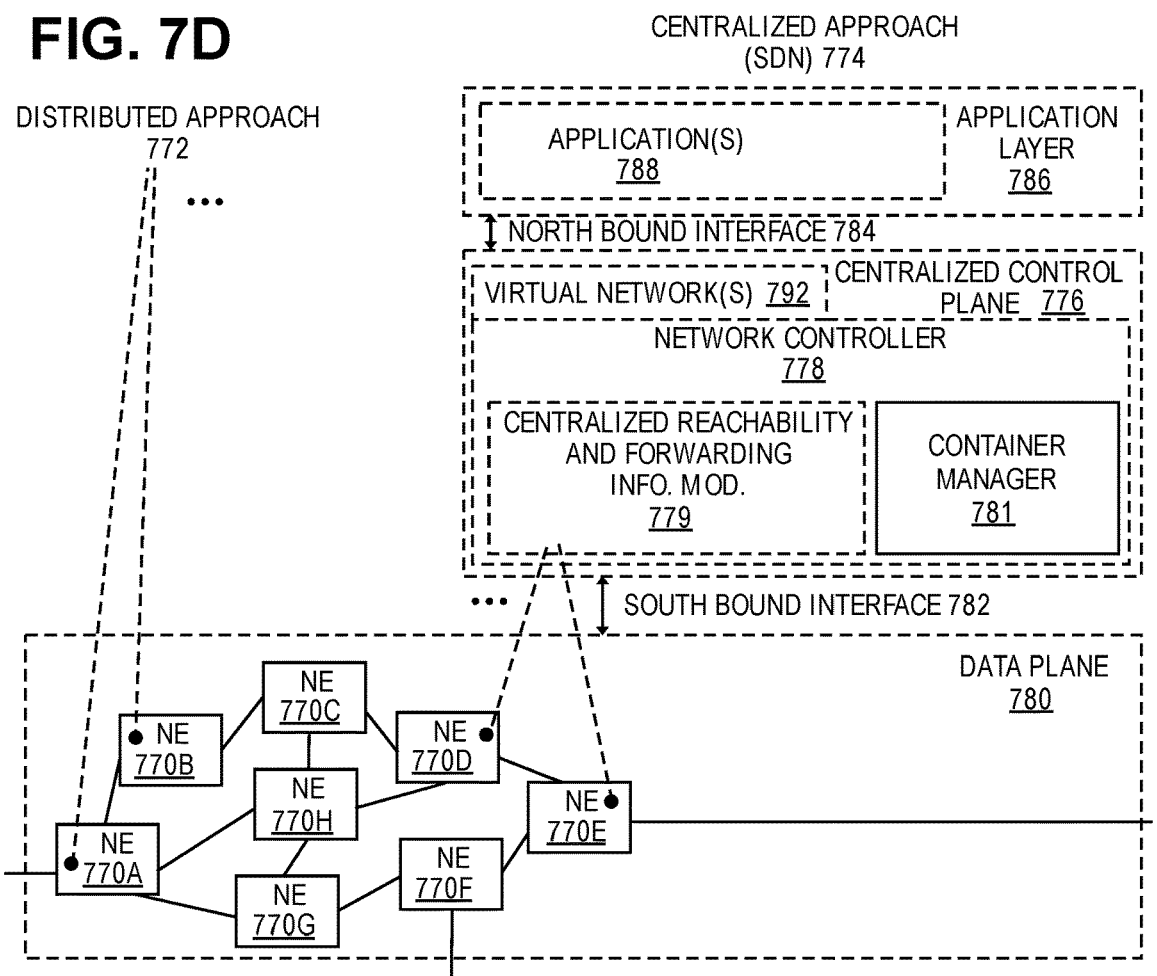
FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 770A-H (e.g., the processor(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the processor(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

Network controller 787 or similar elements can include any combination of the components of the embodiments including the container manager 781. Any number of the functions of the embodiments can be implemented at the centralized approach 774 or in similar situations in support of NFV or SDN functions and implementations related to the embodiments.

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
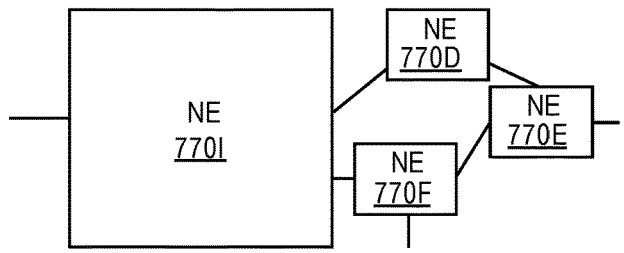
FIG. 7E illustrates the simple case of where each of the NDs implements a single NE, but a centralized control plane has abstracted multiple of the NEs in different NDs into (to represent) a single NE in one of the virtual network(s), according to some embodiments of the invention.
Figure 7F:
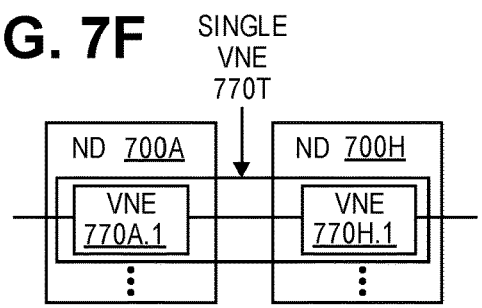
FIG. 7F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 770I in one of the virtual network(s) 792 of FIG. 7D, according to some embodiments of the invention. FIG. 7E shows that in this virtual network, the NE 770I is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
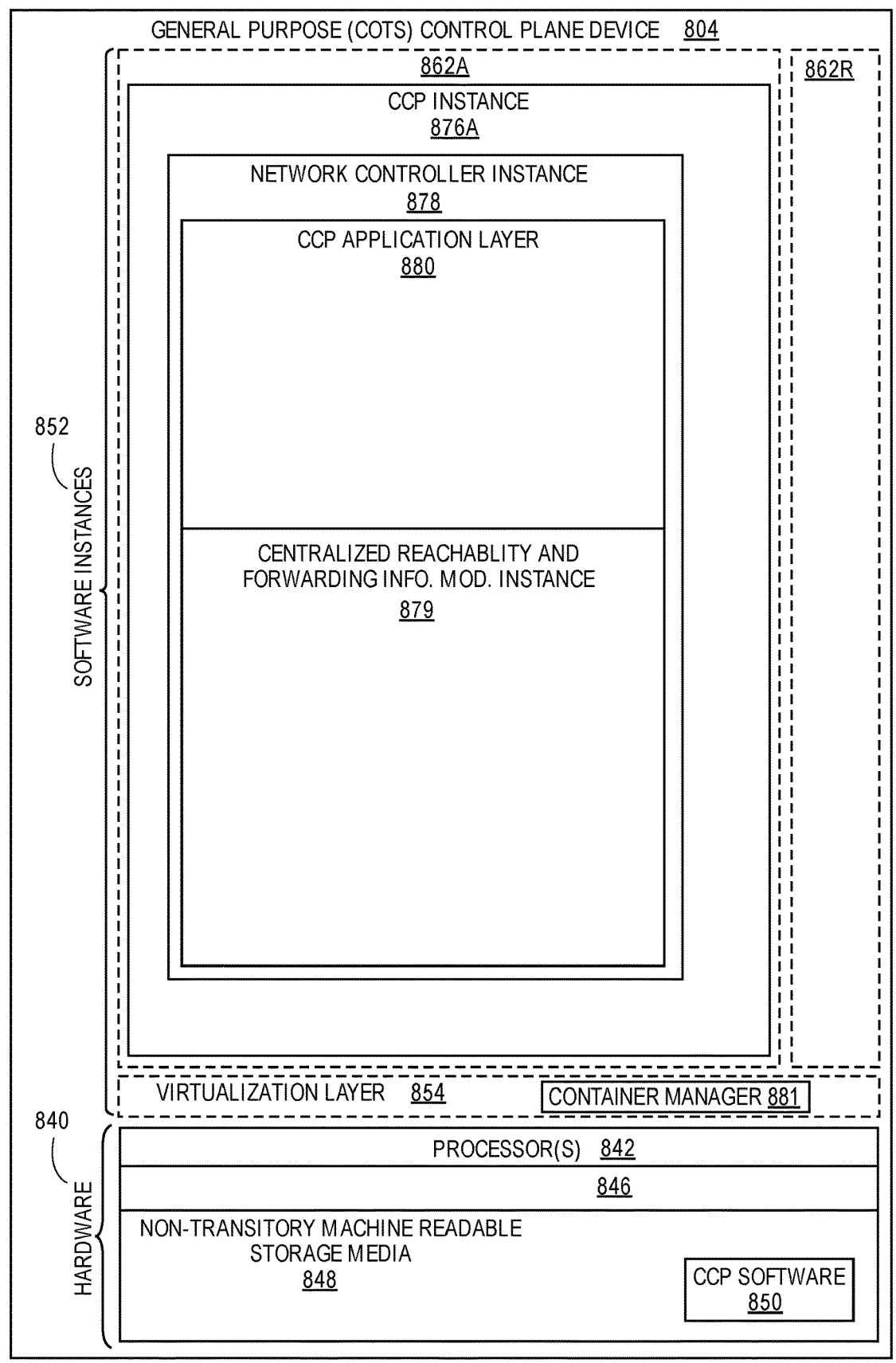
FIG. 8 illustrates a general purpose control plane device with centralized control plane (CCP) software 850), according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include processor(s), a set of one or more physical NIs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and physical NIs 846, as well as non-transitory machine readable storage media 848 having stored therein centralized control plane (CCP) software 850.

Virtualization layer 854 can include any combination of the components of the embodiments including the container manager 881. Similarly, the container manager 881 and related functions can be implemented by the processors 842 and related hardware 840 as well as distributed over multiple electronic or network devices.

In embodiments that use compute virtualization, the processor(s) 842 typically execute software to instantiate a virtualization layer 854 (e.g., in one embodiment the virtualization layer 854 represents the kernel of an operating system (or a shim executing on a base operating system) that allows for the creation of multiple instances 862A-R called software containers (representing separate user spaces and also called virtualization engines, virtual private servers, or jails) that may each be used to execute a set of one or more applications; in another embodiment the virtualization layer 854 represents a hypervisor (sometimes referred to as a virtual machine monitor (VMM)) or a hypervisor executing on top of a host operating system, and an application is run on top of a guest operating system within an instance 862A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 840, directly on a hypervisor represented by virtualization layer 854 (in which case the unikernel is sometimes described as running within a LibOS virtual machine), or in a software container represented by one of instances 862A-R). Again, in embodiments where compute virtualization is used, during operation an instance of the CCP software 850 (illustrated as CCP instance 876A) is executed (e.g., within the instance 862A) on the virtualization layer 854. In embodiments where compute virtualization is not used, the CCP instance 876A is executed, as a unikernel or on top of a host operating system, on the "bare metal" general purpose control plane device 804. The instantiation of the CCP instance 876A, as well as the virtualization layer 854 and instances 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs), and an CCP application layer 880 (sometimes referred to as an application layer) over the middleware layer (providing the intelligence required for various network operations such as protocols, network situational awareness, and user—interfaces). At a more abstract level, this CCP application layer 880 within the centralized control plane 776 works with virtual network view(s) (logical view(s) of the network) and the middleware layer provides the conversion from the virtual networks to the physical view.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of managing dynamic runtime information provision for a container implementing a Session Management Function (SMF) executed by an electronic device in a $3^{rd}$ generation partnership project (3GPP) $5^{th}$ Generation (5G) mobile network core, the method comprising:
    starting a container image load, the container image including at least a secret sub unit and an application sub unit, the application sub unit providing the SMF;
    determining an input source to provide a secret value for the container, the input source identified by information in the secret sub unit in the container image; and
    providing the secret value to a destination sub unit of the container.

2. The method of claim 1, further comprising:
    determining the destination sub unit of the container to receive the secret value is the SMF, the destination sub unit identified by information in the secret sub unit in the container image.

3. The method of claim 1, wherein the secret value is unique to the container within the 5G mobile network core.

4. The method of claim 1, wherein the secret source includes an algorithm defined by the secret sub unit.

5. The method of claim 1, further comprising:
    generating a query to an administrator interface to retrieve data to be utilized to derive the secret value.

6. A method of managing dynamic runtime information provision for a container implementing an Access and Mobility Management Function (AMF) executed by an electronic device in a $3^{rd}$ generation partnership project (3GPP) $5^{th}$ Generation (5G) mobile network core, the method comprising:
    starting a container image load, the container image including at least a secret sub unit and an application sub unit, the application sub unit providing the AMF;
    determining an input source to provide a secret value for the container, the input source identified by information in the secret sub unit in the container image; and
    providing the secret value to a destination sub unit of the container.

7. The method of claim 6, further comprising:
    determining the destination sub unit of the container to receive the secret value is the AMF, the destination sub unit identified by information in the secret sub unit in the container image.

8. The method of claim 6, wherein the secret value is unique to the container.

9. The method of claim 6, wherein the secret source includes an algorithm defined by the secret sub unit.

10. The method of claim 6, further comprising:
    generating a query to an administrator interface to retrieve data to be utilized to derive the secret value.

11. An electronic device in a $3^{rd}$ generation partnership project (3GPP) $5^{th}$ Generation (5G) mobile network core, the electronic device configured to implement a container management system, the container management system to support managing dynamic runtime information provision for a container implementing a Session Management Function (SMF), the electronic device comprising:
    a non-transitory computer-readable medium having stored therein a container manager; and
    a processor coupled to the non-transitory computer-readable medium, the processor to execute the container manager, the container manager to start a container image load, the container image including at least a secret sub unit and an application sub unit, the application sub unit providing the SMF, to determine an input source to provide a secret value for the container, the input source identified by information in the secret sub unit in the container image, and to provide the secret value to a destination sub unit of the container.

12. The electronic device of claim 11, further comprising:
    a secret store coupled to the processor to store information for determining the secret value.

13. The electronic device of claim 11, wherein the container manager includes a runtime secret processing component to generate a query to an administrator interface to retrieve data to be utilized to derive the secret value.

14. The electronic device of claim 11, wherein the container manager is further to determine the destination sub unit of the container to receive the secret value is the SMF, the destination sub unit identified by information in the secret sub unit in the container image.

15. The electronic device of claim 11, wherein the secret value is unique to the container within the 5G mobile network core.

16. An electronic device in a $3^{rd}$ generation partnership project (3GPP) $5^{th}$ Generation (5G) mobile network core, the electronic device configured to implement a container management system, the container management system to support managing dynamic runtime information provision for a container implementing an Access and Mobility Management Function (AMF), the electronic device comprising:
    a non-transitory computer-readable medium having stored therein a container manager; and
    a processor coupled to the non-transitory computer-readable medium, the processor to execute the container manager, the container manager to start a container image load, the container image including at least a secret sub unit and an application sub unit, the application sub unit providing the AMF, to determine an input source to provide a secret value for the container, the input source identified by information in the secret sub unit in the container image, and to provide the secret value to a destination sub unit of the container.

17. The electronic device of claim 16, further comprising:
    a secret store coupled to the processor to store information for determining the secret value.

18. The electronic device of claim 16, wherein the container manager includes a runtime secret processing component to generate a query to an administrator interface to retrieve data to be utilized to derive the secret value.

19. The electronic device of claim 16, wherein the container manager is further to determine the destination sub unit of the container to receive the secret value is the AMF, the destination sub unit identified by information in the secret sub unit in the container image.

20. The electronic device of claim 16, wherein the secret value is unique to the container within the 5G mobile network core.

\* \* \* \* \*